United States Patent [19]
Entschel et al.

[11] 3,862,929
[45] Jan. 28, 1975

[54] HETEROCYCLIC BASIC PHENYLAZOPHENYL DYES CONTAINING A QUATERNIZED AMINOALKYLENECARBOXAMIDE

[75] Inventors: Roland Entschel; Willy Steinemann, both of Basel, Switzerland

[73] Assignee: Fidelity Union Trust Company

[22] Filed: July 3, 1972

[21] Appl. No.: 268,842

Related U.S. Application Data

[62] Division of Ser. No. 743,037, July 8, 1968, Pat. No. 3,674,772.

[30] Foreign Application Priority Data
July 25, 1967 Switzerland.................... 10548/67
Aug. 29, 1967 Switzerland.................... 1225/67

[52] U.S. Cl................ 260/156, 260/152, 260/154, 260/155, 260/157, 260/162, 260/163, 260/146 R, 260/146 D, 260/147, 8/41 A

[51] Int. Cl....................... C09b 29/26, c09b 43/12

[58] Field of Search........... 260/152, 154, 155, 156, 260/157, 146 R, 146 D, 162, 163, 147

[56] References Cited
UNITED STATES PATENTS
1,887,289  11/1932  Conzetti............................ 260/156
2,219,280  10/1940  Graenacher et al. ............... 260/156
3,631,164  12/1971  Hegar .............................. 260/156

3,674,772  7/1972  Entschel et al. ................... 260/156

FOREIGN PATENTS OR APPLICATIONS
37-8084  7/1962  Japan................................. 260/156

*Primary Examiner*—Lorraine A. Weinberger
*Assistant Examiner*—C. F. Warren
*Attorney, Agent, or Firm*—Gerald D. Sharkin; Richard E. Vila; Melvyn M. Kassenoff

[57] ABSTRACT

Dyes of the formula

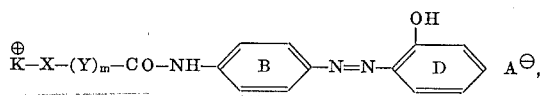

wherein $K^+$ is a quaternary ammonium or hydrazinium group, e.g., a heterocyclic group,
X is alkylene,
Y is arylene;
$A^-$ is an anion, and
m is 0 or 1,
with the proviso that Ring B has 1 or 2 substituents when m is 0 and 0 to 2 substituents when m is 1, and Ring D has 0 to 2 substituents.

These dyes are useful for dyeing and printing polyacrylonitrile and copolymers of acrylonitrile as well as for dyeing leather and paper.

11 Claims, No Drawings

HETEROCYCLIC BASIC PHENYLAZOPHENYL DYES CONTAINING A QUATERNIZED AMINOALKYLENECARBOXAMIDE

This is a division of application Ser. No. 743,037 filed July 8, 1968 and now U.S. Pat. No. 3,674,772.

This invention relates to basic dyes of the formula

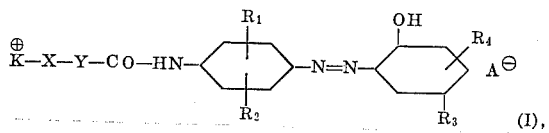  (I), where X stands for a lower, straight or branched alkylene radical which may be substituted, Y for the direct linkage or any arylene radical which may be substituted, $R_1$ for lower alkyl or alkoxy which may be substituted, a halogen atom, or a nitro, cyano, alkylsulphonyl, arylsulphonyl, trifluoromethyl or sulphonic acid amide group, $R_2$ for hydrogen, lower alkyl or alkoxy which may be substituted or a halogen atom, $R_3$ for a hydrogen or halogen atom, an alkyl or alkoxy group which has 1 to 6 carbon atoms and may be substituted, the cyano group, an alkylsulphonyl or arylsulphonyl group which may be substituted, an acylated amino group, a disubstituted sulphonic acid amide group, an oxazoline radical or the radical of 1-aza-2-ketocyclopentane, 1-aza-2-keto-oxacyclopentane or 1-aza-2-keto-oxacyclohexane, $R_4$ for a hydrogen or halogen atom or an alkyl group which has 1 to 6 carbon atoms and may be substituted, $A^-$ for an anion equivalent to the dye cation, and $K^+$ for a group of the formula

  (II), or

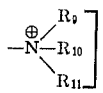  (III).

In the formulae (II) and (III) $R_5$ stands for an alkyl or cycloalkyl radical which may be substituted or together with $R_6$ and the $N^+$- atom for a heterocycle, $R_6$ for an alkyl or cycloalkyl radical which may be substituted or together with $R_5$ and the $N^+$-atom for a heterocycle, $R_7$ and $R_8$ for hydrogen or identical or different alkyl or cycloalkyl radicals which may be substituted, $R_9$, $R_{10}$ and $R_{11}$ each stands for an alkyl or cycloalkyl radical which may be substituted, and where $R_5$ together with $R_7$ and/or $R_6$ together with $R_8$ and the N atoms adjacent to these substituents, and $R_9$ and $R_{10}$ or $R_9$, $R_{10}$ and $R_{11}$ together with the $N^+$ atom, may form heterocycles.

The dyes of formula (I) can be produced by reacting a compound of the formula

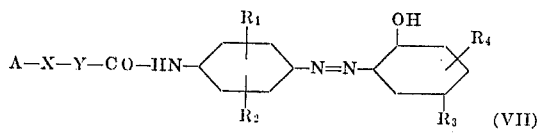  (VII)

where A represents the acid radical of an ester, with a compound of the formula

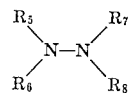  (VIII)

or

  (IX)

Dyes of the formula (I) in which $R_3$ has a meaning other than hydrogen can be obtained by coupling the diazo component of an amine of the formula

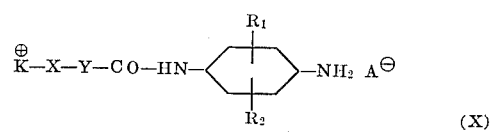  (X)

with a compound of the formula

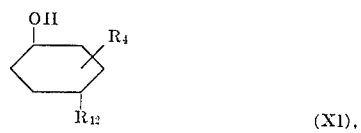  (XI), where $R_{12}$ represents a halogen atom or a substituted or unsubstituted alkyl or alkoxy group having 1 to 6 carbon atoms, the cyano group, a substituted or unsubstituted alkylsulphonyl or arylsulphonyl group, an acylated amino group, a disubstituted, e.g. dialkylated, sulphonic acid amide group, an oxazoline radical, or the radical of 1-aza-2-ketocyclopentane, 1-aza-2-ketooxacyclopentane or 1-aza-2-keto-3-oxacyclohexane.

Dyes of the formula (I) in which $R_9$ and $R_{10}$ each stands for a substituted or unsubstituted alkyl or cycloalkyl radical, or together with the adjacent N atom form a saturated or partially saturated heterocycle, e.g. a piperidine, piperazine, pyrrolidine, morpholine or aziridine ring, can be obtained by converting a compound of the formula

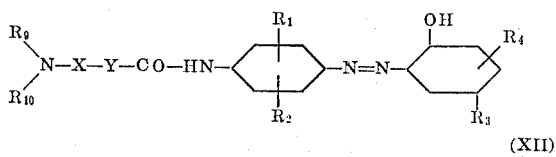  (XII)

with a quaternating agent $R_{11}$-A (a) into a compound of the formula

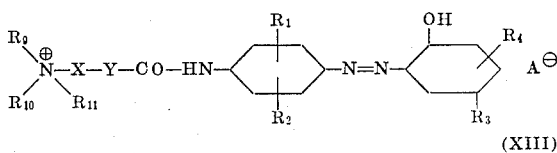  (XIII)

The dyes of formula (I) can also be produced by condensing a carboxylic acid or a functional derivative of a carboxylic acid of the formula $$K^{\oplus} - X - Y - COOH ] A^{\ominus} \quad (XIV)$$

with an aminoazo dye of the formula

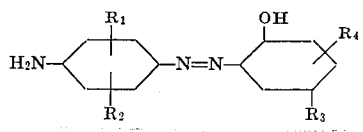

(XV)

Particularly good dyes correspond to the formula

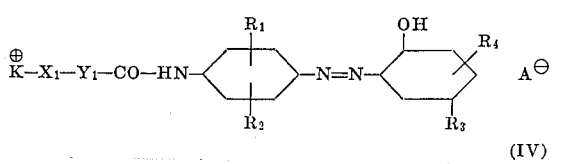

(IV)

where $X_1$ represents one of the radicals

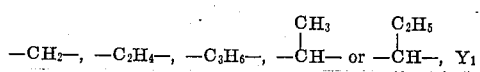

represents the direct linkage, and $R_1$, $R_2$, $R_3$, $R_4$, $A^{\ominus}$ and $K^{\oplus}$ have the previously stated meanings. Similarly good dyes correspond to the formula

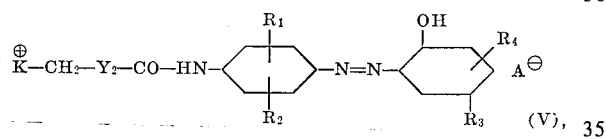

(V), where $Y_2$ represents an arylene radical, preferably a phenylene radical, which may be substituted and $R_1$, $R_2$, $R_3$, $R_4$, $A^-$ and $K^+$ have the meanings given them in the foregoing. Equally good dyes correspond to the formula

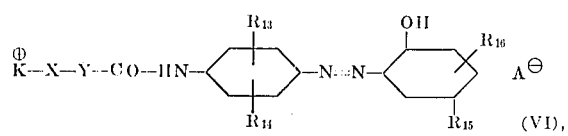

(VI), where $R_{13}$ represents methyl, ethyl, methoxy, ethoxy, trifluors methyl, nitro, chlorine or bromine, $R_{14}$ hydrogen, methyl, ethyl, methoxy or ethoxy, $R_{15}$ hydrogen, halogen or alkyl or alkoxy radical having 1 to 6 carbon atoms, and $R_{16}$ hydrogen.

In the dyes of the formula (I) the anion $A^-$ may be exchanged for another anion, e.g. with the aid of an ion exchanger. In each instance "halogen" refers preferably to chlorine or bromine.

The low molecular, substituted or unsubstituted alkyl or alkoxy radicals generally contain 1 to 6 or preferably 1 to 4 or 1 to 3 carbon atoms. If these radicals are substituted, in particular the alkyl radicals, they contain for example a hydroxyl group, a halogen atom, the cyano group or an aryl radical; thus, substituted alkyl can stand for an aralkyl radical such as the benzyl radical. Examples of alkylsulphonyl and arylsulphonyl radicals are methylsulphonyl, ethylsulphonyl and phenylsulphonyl. The monoalkyl- or preferably dialkylsulphonic acid amide group is an example of a sulphonic acid amide group. The alkyl radical is preferably a lower alkyl radical.

When neither $R_7$ nor $R_8$ stands for a hydrogen atom the radicals $R_5$ to $R_8$ represent unsubstituted or substituted alkyl radicals such as methyl, ethyl, propyl, or butyl radicals, or cycloalkyl radicals such as cyclohexyl radicals. If these radicals are substituted they contain in particular a hydroxyl group, a halogen atom, the cyano or phenyl group; thus substituted alkyl can stand for an aralkyl, e.g. benzyl, radical.

The radicals $R_5$ and $R_6$ together with the adjacent $N^+$ atom may form a heterocycle, e.g. a pyrrolidine, piperazine, morpholine, aziridine or piperidine ring.

The radical $R_5$ together with $R_7$ and/or the radical $R_6$ together with $R_8$ and the N atoms adjacent to these substituents may form a saturated or unsaturated, preferably five- or six-membered heterocycle, e.g. a pyrazolidine, pyridazine or pyrazoline ring such as trimethylene-pyrazolidine or tetramethylene-pyrazolidine.

The radicals $R_9$ to $R_{11}$ represent substituted or unsubstituted alkyl radicals, e.g. methyl, ethyl, propyl or butyl radicals, or cycloalkyl radicals such as cyclohexyl radicals. If these radicals are substituted they contain in particular a hydroxyl group, a halogen atom, the cyano or a phenyl group; thus, substituted alkyl can stand for an aralkyl radical, e.g. a benzyl radical.

The radicals $R_9$ and $R_{10}$ together with the adjacent $N^+$ atom may form a heterocycle, e.g. a pyrrolidine, piperidine, morpholine, aziridine or piperazine ring.

The radicals $R_9$ to $R_{11}$ together with the adjacent $N^+$ atom may form a heterocycle, e.g. a group of the formula

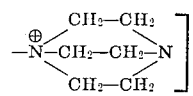

or a pyridine ring.

When X represents an alkylene radical it is desirable for Y to stand for the direct linkage, though Y may alternatively be a substituted or unsubstituted arylene radical such as a phenylene, naphthylene or tetrahydronaphthylene radical.

The alkylene radical X may contain 1 to 6 or preferably 1 to 3 carbon atoms; it may be straight or branched and substituted, for example by hydroxyl.

The preferred acid radicals A are those of hydrohalic acids; A stands for Cl or Br. Examples of further acid radicals A are those of sulphuric acid, a sulphonic acid or of hydrogen sulphide.

The anion $A^-$ may be an organic or inorganic ion, e.g. a halogen ion such as chlorine, bromine or iodine, or the ion of methylsulphate, sulphate, disulphate, perchlorate, phosphate, phosphotungstic molybdate, benzenesulphonate, naphthalenesulphonate, 4-chlorobenzenesulphonate, oxalate, maleinate, acetate, propionate, methanesulphonate, chloroacetate or benzoate, or a complex anion such as that of zinc chloride double salts.

The reaction of a compound of the formula (VII) with a compound of formula (XIII) or (IX) is effected preferably in an organic solvent at temperatures of $-50°$ to $+250°C$, most advantageously at $-10°$ to $+120°C$.

The reaction can be conducted in an aqueous medium with the addition of an organic solvent or in the absence of organic solvent at the aforestated temperatures.

The reaction of a compound of formula (XII) with a quaternating agent to form a compound of formula (XIII) is carried out preferably in an inert solvent, in aqueous suspension or without solvent in an excess of the quaternating agent $R_{11}$ —A, and at elevated temperatures and if required in a buffered medium. Examples of quaternating agents are alkyl halides, e.g. methyl or ethyl chloride, bromide or iodide, alkylsulphates such as dimethyl sulphate, acrylic acid amide/-hydrochloride, e.g. $CH_2=CH-CO-NH_2/HCl$.

The coupling of diazotized compounds of formula (X) with compounds of formula (XI) generally takes place in alkali medium with cooling, for example at 0 -5°C, but it can also be carried out in acetic acid medium.

The new dyes are used for dyeing and printing polyacrylonitrile and acrylonitrile copolymer fibres and textiles made therefrom. They are also employed for dyeing leather and paper.

The dyes of this invention are applicable from weakly alkaline, neutral or weakly acid baths in so far as they are present as salts of strong inorganic or organic acids which form approximately neutral aqueous solutions. It is of advantage to dye from an acid bath, either by preparing the bath with an acid, for example acetic, formic, tartaric, naphthalenesulphonic, sulphuric or phosphoric acid, or alkali bisulphate or acid alkali phosphates, or by adding a substance which produces acid during dyeing, for example the salts of volatile bases with strong nonvolatile acids, such as ammonium sulphate, or water soluble esters of organic acids which are saponified in dyeing, for example the methyl or ethyl esters of aliphatic oxy acids such as lactic, malic or tartaric acid. If mineral acid solutions of the dyes are employed for dyeing, which is the case with betain-like compounds, the mineral acid can be adjusted during the dyeing process by the gradual addition of an alkaline salt of a weaker acid such as sodium acetate. Dyeing is carried out at temperatures approaching the boil in open baths or at temperatures about 100°C under pressure in enclosed machines. Given the stated dyeing conditions the baths are exhausted in normal times and very level dyeings are obtained which are mostly of very bright shade, have very good light and wet fastness and are pH-stable.

In Japanese Patent No. 8084/62 the dye of the formula

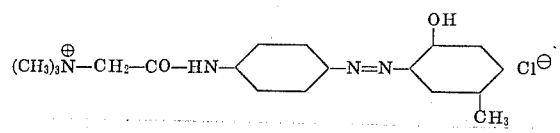

is described, which among other purposes is used for dyeing polyacrylonitrile fibres. The dyes of formula (I) give dyeings of significantly greater depth than this dye on polyacrylonitrile fibres.

In the following Examples the parts and percentages are by weight and the temperatures in degrees centigrade.

EXAMPLE 1

Q6.2 Parts of 4-amino-2-chloro-2'-hydroxy-5'-methyl-1,1'-azobenzene are dissolved in 500 parts of toluene at 100°. The solution is cooled to 80° and at this temperature a solution of 12 parts of chloroacetyl chloride in 60 parts of toluene is dropped in at a uniform rate over 1 hour. The reaction temperature is then increased to 107° and stirring continued for a further 2 hours at this temperature, after which the temperature is allowed to fall to 80°. In the course of 30 minutes a solution of 7.2 parts of N,N-dimethylhydrazine in 60 parts of toluene is added. The reaction is allowed to proceed for 1 hour at 80°, then the temperature is raised to 90° and stirring continued for 4 hours. Finally the reaction mixture is allowed to cool to room temperature and the precipitated yellow dye filtered off. The dye can be obtained in the pure form by recrystallization from acetic acid; it is water soluble and gives very fast dyeings of good depth on polyacrylonitrile fibers.

EXAMPLE 2

29.2 Parts of 4-amino-2-chloro-5-methoxy-2'-hydroxy-5'-methyl-1,1'-azobenzene are dissolved in 450 parts of chlorobenzene at 110°. At the same temperature a solution of 21 parts of 3-chloromethyl-4-methylbenzoyl chloride in 70 parts of chlorobenzene is added dropwise in the course of 1 hour. The reaction temperature is increased to 130°, the solution stirred for 3 hours and then cooled to 75°, at which temperature the solution of 6.6 parts of N,N-dimethylhydrazine in 30 parts of chlorobenzene is added over 30 minutes. Finally the temperature is again raised to 95° and stirring continued for 4 hours at this temperature. On cooling to 30° the water soluble dye settles out. It is filtered off and if necessary purified by recrystallization from acetic acid. It dyes polyacrylonitrile fibres in yellow shades of excellent fastness.

The 21 parts of 3-chloromethyl-4-methylbenzoyl chloride used in this Example can be replaced by 19.5 parts of 4-chloromethylbenzoyl chloride and the reaction conducted on the same lines, upon which a yellow dye is obtained which has the same excellent fastness properties and tinctorial strength on acrylonitrile fibres.

EXAMPLE 3

N,N-dimethylhydrazinium-N-acetic acid-N'-(4-amino-3'-chloro-6'-methylphenyl)-amide is prepared by reacting 1-chloroacetylamino-2-methyl-4-nitro-5-chlorobenzene with N,N-dimethylhydrazine in water or an inert organic solvent, e.g. toluene, at 75°- 95° and then reducing the nitro group. 30.9 Parts of this amide are dissolved in a mixture of 80 parts of water and 25 parts of 30% hydrochloric acid and diazotized with 6.9 parts of sodium nitrite at 0°- 2°. An ice cold solution of 12 parts of 1-hydroxy-4-methylbenzene in 150 parts of water is added to the diazo solution and coupling carried out at a pH value of 7.0 - 8.5 adjusted with sodium bicarbonate. Subsequently the temperature is raised to 35° and the pH adjusted to 3.0 with hydrochloric acid. The dye settles out and is filtered off and recrystallized from acetic acid if necessary. On polyacrylonitrile fibres it gives yellow dyeings of good depth and excellent fastness.

EXAMPLE 4

36 Parts of 2-hydroxy-2'-chloro-4'-(δ-dimethylamino)-acetylamino-5-methyl-5'-methoxy-1,1'-azobenzene, prepared by reacting 2-hydroxy-2'-chloro-4'-chloroacetylamino-5-methyl-5'-methoxy-1,1'-azobenzene with dimethylamine, e.g. in toluene at 60°, are dissolved in 750 parts of chlorobenzene at 120°. At this temperature a solution of 25 parts of dimethylsulphate and 50 parts of chlorobenzene is added over 20 minutes and the reaction mixture is then boiled for 1 hour with reflux. On cooling to 40° the precipitated water soluble dye is collected on a filter. It can be converted into the chloride by precipitation from aqueous solution, e.g. with sodium chloride. The dye gives fast, bright level dyeings of good depth on polyacrylonitrile fibres.

EXAMPLE 5

27.1 Parts of 4-amino-2'-hydroxy-2,5'-dimethyl-5-methoxy-1,1 azobenzene are dissolved in 350 parts of nitrobenzene at 80°. In the course of 1 hour 12.5 parts of distilled chloroacetyl chloride are added dropwise at the same temperature with stirring, and afterwards stirring is continued at 85° until no further aminoazo compound is indicated. Then 11 parts of distilled pyridine are added to the dye solution at 85° in the course of 20 minutes and the reaction temperature is raised to 110° over 1 hour. After 2 hours at 110° quaternation is complete. The solution is allowed to cool to 40° and the precipitated dye collected on a filter. After purification by crystallization, drying and grinding, the dye is obtained as an orange powder which dissolves in water with a yellow colour and gives very fast yellow dyeings on polyacrylonitrile fibres.

EXAMPLE 6

26.1 Parts of 4-amino-2'-hydroxy-2-chloro-5'-methyl-1,1'-azobenzene are dissolved in 150 parts of dioxan at 80°, and at this temperature a solution of 12 parts of chloroacetyl chloride in 20 parts of dioxan is added dropwise at an even rate over 30 minutes. Stirring is continued at 80° until no further diazotizable compound is indicated, on which 17 parts of quinoline are added at an even rate over 30 minutes at 80°. The reaction temperature is raised to 95°, the reaction solution stirred for 5 hours at this temperature and then cooled to 35°. The precipitated compound is filtered off purified by recrystallization, dried and ground. The new dye is a water soluble orange powder which dyes polyacrylonitrile fibres in very fast yellow shades.

EXAMPLE 7

22.5 Parts of 4-amino-2'-hydroxy-2,5,5'-trimethyl-1,1'-azobenzene are dissolved in 500 parts of toluene. 22 Parts of pyridiniumchloride-N-acetic acid chloride, prepared by reacting pyridinium chloride-N-acetic acid and thionyl chloride, are added and the solution is held at about 100° until no further acylated amino dye is indicated. On cooling to 40° the dye is filtered off, freed from absorbed toluene in vacuum and recrystallized from dilute acetic acid. On polyacrylonitrile fibres it gives yellow dyeings of excellent light and wet fastness.

When the 22 parts of pyridinium chloride-N-acetic acid chloride are replaced by the equivalent amount of α-picolinium chloride-N-acetic acid chloride or quinolinium chloride-N-acetic acid chloride, dyes with similar properties are obtained.

Dyeing Example

A mixture of 20 parts of the dye of Example 1 and 80 parts of dextrin is ground in a ball mill for 48 hours. One part of the resulting preparation is pasted with 1 part of 40% acetic acid solution, 400 parts of distilled water are run onto the paste with stirring and the whole is boiled for a short time. The solution is diluted with 7000 parts of distilled water and finally 2 parts of acetic acid are added. 100 Parts of polyacrylonitrile fabric are entered into this bath at 60°, following treatment for 10–15 minutes at 60° in a bath of 8000 parts of water and 2 parts of glacial acetic acid. The dyebath is raised to 100° in 20 minutes and held at the boil for 1 hour. On rinsing and drying a level yellow dyeing of good depth and with good light and wet fastness is obtained.

In the following Table 1 the structural composition of further dyes is shown; these dyes can be produced by the procedures of Examples 1 - 7. The symbols $K^+$, W and $X_1$ to $X_7$ in the formula

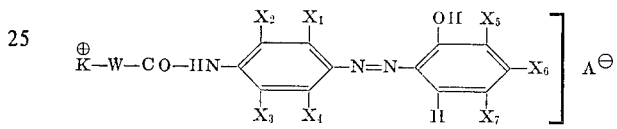

have the meaning given them in the Table. The anion $A^-$ may be any one of those named in the specification. The symbol $K^+$ may stand for any one of the radicals $K_1 - K_{23}$ listed in Table A. In any of the dyes these groupings can be exchanged for any other of the stated groupings.

In Table A $K^+$ may represent any one of the symbols $K_1 - K_{23}$ which represent the following groupings:

TABLE A

| | |
|---|---|
| $K_1$ represents | $-N(CH_3)_3$ |
| $K_2$ represents | $-N(C_2H_5)_3$ |
| $K_3$ represents | $-N(C_2H_5)_2\overset{\displaystyle CH_3}{\vert}$ |
| $K_4$ represents | $-N(C_2H_4OH)_3$ |
| $K_5$ represents | $-N(C_2H_4OH)_2\overset{\displaystyle CH_3}{\vert}$ |
| $K_6$ represents | piperazinium ring |
| $K_7$ represents | pyridinium |
| $K_8$ represents | N-methyl pyridinium |
| $K_9$ represents | N-methyl pyridinium |
| $K_{10}$ represents | N-methyl morpholinium |
| $K_{11}$ represents | $-N(CH_3)_2\overset{\displaystyle C_2H_4OH}{\vert}$ |

TABLE A—Continued $K_{12}$ represents:
$$-N\begin{array}{c}CH_3\\-C_2H_4OH\\C_2H_5\end{array}$$

$K_{13}$ represents:
$$-N\begin{array}{c}C_2H_5\\(CH_3)_2\end{array}$$

$K_{14}$ represents: 2-methylpyridinium ($H_3C$-pyridine)

$K_{15}$ represents: quinolinium $K_{16}$ represents:
$$-N(CH_3)_2 \\ | \\ NH_2$$

$K_{17}$ represents:
$$-N(C_2H_5)_2 \\ | \\ NH_2$$

$K_{18}$ represents:
$$-N(C_2H_4OH)_2 \\ | \\ NH_2$$

$K_{19}$ represents: 1-amino-pyrrolidinyl (N-NH_2 with -CH_2-CH_2-CH_2-CH_2-)

$K_{20}$ represents: 1-amino-piperidinyl $K_{21}$ represents: 4-amino-morpholinyl (with O in ring, NH_2 on N)

$K_{22}$ represents:
$$N(C_2H_4CN)_2 \\ | \\ NH_2$$

$K_{23}$ represents: 1,5-diazabicyclic structure (N–N bridged by CH_2 groups)

TABLE 1

| Ex. No. | W | $k^\ominus$ | $X_1$ | $X_2$ | $X_3$ | $X_4$ | $X_5$ | $X_6$ | $X_7$ | Shade of dyeing on polyacrylonitril fibre |
|---|---|---|---|---|---|---|---|---|---|---|
| 8 | $-CH_2-$ | $K_7$ | $CH_3$ | H | H | H | H | H | $CH_3$ | Yellow. |
| 9 | $-CH_2-$ | $K_7$ | Cl | H | H | H | H | H | $CH_3$ | Do. |
| 10 | $-CH_2-$ | $K_7$ | H | $OCH_3$ | H | H | $CH_3$ | H | $CH_3$ | Do. |
| 11 | $-CH_2-$ | $K_7$ | H | Cl | H | H | H | H | $CH_3$ | Do. |
| 12 | $-CH_2-$ | $K_7$ | Br | H | H | H | H | H | $CH_3$ | Do. |
| 13 | $-CH_2-$ | $K_7$ | H | $NO_2$ | H | H | H | H | $CH_3$ | Do. |
| 14 | $-CH_2-$ | $K_7$ | $NO_2$ | H | H | H | H | H | $CH_3$ | Yellow brown. |
| 15 | $-CH_2-$ | $K_7$ | H | $CF_3$ | H | H | H | $CH_3$ | $CH_3$ | Yellow. |
| 16 | $-CH_2-$ | $K_{13}$ | $CH_3$ | H | H | H | H | $CH_3$ | $CH_3$ | Do. |
| 17 | $-CH_2-$ | $K_{13}$ | $CH_3$ | H | $CH_3$ | H | H | H | $CH_3$ | Do. |
| 18 | $-CH_2-$ | $K_{15}$ | $CH_3$ | H | $OCH_3$ | H | H | $CH_3$ | $CH_3$ | Do. |
| 19 | $-CH_2-$ | $K_1$ | $CH_3$ | H | $OCH_3$ | H | H | H | $CH_3$ | Do. |
| 20 | $-CH_2-$ | $K_2$ | $CH_3$ | H | $CH_3O$ | H | H | H | $CH_3$ | Do. |
| 21 | $-CH_2-$ | $K_3$ | $CH_3$ | H | $CH_3O$ | H | H | H | $CH_3$ | Do. |
| 22 | $-CH_2-$ | $K_4$ | $CH_3$ | H | $CH_3O$ | H | H | H | $CH_3$ | Do. |
| 23 | $-CH_2-$ | $K_5$ | $CH_3$ | H | $CH_3O$ | H | H | H | $CH_3$ | Do. |
| 24 | $-CH_2-$ | $K_6$ | $CH_3$ | H | $CH_3O$ | H | H | H | $CH_3$ | Do. |
| 25 | $-CH_2-$ | $K_8$ | $CH_3$ | H | $CH_3O$ | H | H | H | $CH_3$ | Do. |
| 26 | $-CH_2-$ | $K_9$ | $CH_3$ | H | $CH_3O$ | H | H | H | $CH_3$ | Do. |
| 27 | $-CH_2-$ | $K_{10}$ | $CH_3$ | H | $CH_3O$ | H | H | H | $CH_3$ | Do. |
| 28 | $-CH_2-$ | $K_{14}$ | $CH_3$ | H | $CH_3O$ | H | H | H | $CH_3$ | Do. |
| 29 | $-CH_2-$ | $K_{16}$ | $CH_3$ | H | $CH_3O$ | H | H | H | $CH_3$ | Do. |
| 30 | $-CH_2-$ | $K_{17}$ | $CH_3$ | H | $CH_3O$ | H | H | H | $CH_3$ | Do. |
| 31 | $-CH_2-$ | $K_{19}$ | $CH_3$ | H | $CH_3O$ | H | H | H | $CH_3$ | Do. |
| 32 | $-CH_2-$ | $K_{20}$ | $CH_3$ | H | $CH_3O$ | H | H | H | $CH_3$ | Do. |
| 33 | $-CH_2-$ | $K_{21}$ | $CH_3$ | H | $CH_3O$ | H | H | H | $CH_3$ | Do. |
| 34 | $-CH_2-$ | $K_1$ | $CH_3O$ | H | $CH_3O$ | H | H | H | $CH_3$ | Do. |
| 35 | $-CH_2-$ | $K_{14}$ | $CH_3O$ | H | $CH_3O$ | H | H | H | $CH_3$ | Do. |
| 36 | $-CH_2-$ | $K_7$ | $CH_3O$ | H | $CH_3O$ | H | H | H | $CH_3$ | Do. |
| 37 | $-CH_2-$ | $K_{16}$ | $CH_3O$ | H | $CH_3O$ | H | H | H | $CH_3$ | Do. |
| 38 | $-CH_2-$ | $K_1$ | $CH_3$ | H | $CH_3$ | H | H | H | $CH_3$ | Do. |
| 39 | $-CH_2-$ | $K_6$ | $CH_3$ | H | $CH_3$ | H | H | H | $CH_3$ | Do. |
| 40 | $-CH_2-$ | $K_{15}$ | $CH_3$ | H | $CH_3$ | H | H | H | $CH_3$ | Do. |
| 41 | $-CH_2-$ | $K_{19}$ | $CH_3$ | H | $CH_3$ | H | H | H | $CH_3$ | Do. |
| 42 | $-CH_2-$ | $K_1$ | H | $CH_3$ | H | H | H | H | $CH_3$ | Do. |
| 43 | $-CH_2-$ | $K_2$ | H | $CH_3$ | H | H | H | H | $CH_3$ | Do. |
| 44 | $-CH_2-$ | $K_4$ | H | $CH_3$ | H | H | H | H | $CH_3$ | Do. |
| 45 | $-CH_2-$ | $K_5$ | H | $CH_3$ | H | H | H | H | $CH_3$ | Do. |
| 46 | $-CH_2-$ | $K_6$ | H | $CH_3$ | H | H | H | H | $CH_3$ | Do. |
| 47 | $-CH_2-$ | $K_7$ | H | $CH_3$ | H | H | H | H | $CH_3$ | Do. |
| 48 | $-CH_2-$ | $K_8$ | H | $CH_3$ | H | H | H | H | $CH_3$ | Do. |
| 49 | $-CH_2-$ | $K_9$ | H | $CH_3$ | H | H | H | H | $CH_3$ | Do. |
| 50 | $-CH_2-$ | $K_{16}$ | H | $CH_3$ | H | H | H | H | $CH_3$ | Do. |
| 51 | $-CH_2-$ | $K_{17}$ | H | $CH_3$ | H | H | H | H | $CH_3$ | Do. |
| 52 | $-CH_2-$ | $K_{19}$ | H | $CH_3$ | H | H | H | H | $CH_3$ | Do. |
| 53 | $-CH_2-$ | $K_1$ | Cl | H | H | H | H | H | $CH_3$ | Do. |
| 54 | $-CH_2-$ | $K_2$ | Cl | H | H | H | H | H | $CH_3$ | Do. |
| 55 | $-CH_2-$ | $K_3$ | Cl | H | H | H | H | H | $CH_3$ | Do. |
| 56 | $-CH_2-$ | $K_4$ | Cl | H | H | H | H | H | $CH_3$ | Do. |
| 57 | $-CH_2-$ | $K_5$ | Cl | H | H | H | H | H | $CH_3$ | Do. |
| 58 | $-CH_2-$ | $K_6$ | Cl | H | H | H | H | H | $CH_3$ | Do. |
| 59 | $-CH_2-$ | $K_8$ | Cl | H | H | H | H | H | $CH_3$ | Do. |
| 60 | $-CH_2-$ | $K_9$ | Cl | H | H | H | H | H | $CH_3$ | Do. |
| 61 | $-CH_2-$ | $K_{10}$ | Cl | H | H | H | H | H | $CH_3$ | Do. |
| 62 | $-CH_2-$ | $K_{13}$ | Cl | H | H | H | H | H | $CH_3$ | Do. |
| 63 | $-CH_2-$ | $K_{17}$ | Cl | H | H | H | H | H | $CH_3$ | Do. |
| 64 | $-CH_2-$ | $K_{19}$ | Cl | H | H | H | H | H | $CH_3$ | Do. |
| 65 | $-CH_2-$ | $K_{20}$ | Cl | H | H | H | H | H | $CH_3$ | Do. |
| 66 | $-CH_2-$ | $K_{21}$ | Cl | H | H | H | H | H | $CH_3$ | Do. |
| 67 | $-CH_2-$ | $K_2$ | Cl | H | $CH_3O$ | H | H | H | $CH_3$ | Do. |
| 68 | $-CH_2-$ | $K_7$ | Cl | H | $CH_3O$ | H | H | H | $CH_3$ | Do. |
| 69 | $-CH_2-$ | $K_8$ | Cl | H | $CH_3O$ | H | H | H | $CH_3$ | Do. |
| 70 | $-CH_2-$ | $K_{15}$ | Cl | H | $CH_3O$ | H | H | H | $CH_3$ | Do. |
| 71 | $-CH_2-$ | $K_{17}$ | Cl | H | $CH_3O$ | H | H | H | $CH_3$ | Do. |

Table I—Continued

| Ex. No. | W | k⊖ | X₁ | X₂ | X₃ | X₄ | X₅ | X₆ | X₇ | Shade of dyeing on polyacrylonitril fibre |
|---|---|---|---|---|---|---|---|---|---|---|
| 72 | —CH₂— | K₁₉ | Cl | H | CH₃O | H | H | H | CH₃ | Do. |
| 73 | —CH₂— | K₁ | Cl | H | H | H | H | H | Cl | Do. |
| 74 | —CH₂— | K₇ | Cl | H | H | H | H | H | Cl | Do. |
| 75 | —CH₂— | K₁₆ | Cl | H | H | H | H | H | Cl | Do. |
| 76 | —CH₂— | K₁ | H | CH₃ | H | H | H | H | Cl | Do. |
| 77 | —CH₂— | K₇ | H | CH₃ | H | H | H | H | CH₃ | Do. |
| 78 | —CH₂— | K₁₆ | H | CH₃ | H | H | H | H | CH₃ | Do. |
| 79 | —CH₂— | K₁ | Cl | H | CH₃ | H | H | H | CH₃ | Do. |
| 80 | —CH₂— | K₇ | Cl | H | CH₃ | H | H | H | CH₃ | Do. |
| 81 | —CH₂— | K₁₀ | Cl | H | CH₃ | H | H | H | CH₃ | Do. |
| 82 | —CH₂— | K₁ | H | CH₃O | H | H | H | H | CH₃ | Do. |
| 83 | —CH₂— | K₇ | H | CH₃O | H | H | H | H | CH₃ | Do. |
| 84 | —CH₂— | K₁₆ | H | CH₃O | H | H | H | H | CH₃ | Do. |
| 85 | —CH₂— | K₁ | H | CH₃O | H | H | H | CH₃ | CH₃ | Do. |
| 86 | —CH₂— | K₇ | H | CH₃O | H | H | H | CH₃ | CH₃ | Do. |
| 87 | —CH₂— | K₁₀ | H | CH₃O | H | H | H | CH₃ | CH₃ | Do. |
| 88 | —CH₂— | K₁ | H | CH₃ | H | H | CH₃ | H | CH₃ | Do. |
| 89 | —CH₂— | K₇ | H | CH₃ | H | H | CH₃ | H | CH₃ | Do. |
| 90 | —CH₂— | K₁₆ | H | CH₃ | H | H | H | H | CH₃ | Do. |
| 91 | —CH₂— | K₁ | CF₃ | H | H | H | H | H | CH₃ | Do. |
| 92 | —CH₂— | K₇ | CF₃ | H | H | H | H | H | CH₃ | Do. |
| 93 | —CH₂— | K₁₆ | CF₃ | H | H | H | H | H | CH₃ | Do. |
| 94 | —CH₂— | K₁ | H | CF₃ | H | H | H | H | CH₃ | Do. |
| 95 | —CH₂— | K₇ | H | CF₃ | H | H | H | H | CH₃ | Do. |
| 96 | —CH₂— | K₁₆ | H | CF₃ | H | H | H | H | CH₃ | Do. |
| 97 | —CH₂— | K₁ | CH₃O | H | CH₃ | H | H | H | CH₃ | Do. |
| 98 | —CH₂— | K₇ | CH₃O | H | CH₃ | H | H | H | CH₃ | Do. |
| 99 | —CH₂— | K₁₆ | CH₃O | H | CH₃ | H | H | H | CH₃ | Do. |
| 100 | —CH₂— | K₁ | C₂H₅O | H | C₂H₅O | H | H | H | CH₃ | Do. |
| 101 | —CH₂— | K₁ | CN | H | H | H | H | H | CH₃ | Do. |
| 102 | —CH₂— | K₇ | CN | H | H | H | H | H | CH₃ | Do. |
| 103 | —CH₂— | K₁₆ | CN | H | H | H | H | H | CH₃ | Do. |
| 104 | —CH₂— | K₁₉ | CN | H | H | H | H | H | Cl | Do. |
| 105 | —CH₂— | K₁ | CN | H | H | H | H | H | CN | Do. |
| 106 | —CH₂— | K₇ | CN | H | H | H | H | H | C₂H₅O | Do. |
| 107 | —CH₂— | K₁₆ | CN | H | H | H | CH₃O | H | C₂H₅O | Do. |
| 108 | —CH₂— | K₁ | H | NO₂ | H | H | H | H | CH₃ | Do. |
| 109 | —CH₂— | K₇ | H | NO₂ | H | H | H | H | CH₃ | Do. |
| 110 | —CH₂— | K₁₆ | H | NO₂ | H | H | H | H | CH₃ | Do. |
| 111 | —CH₂— | K₁₉ | H | NO₂ | H | H | H | H | CH₃ | Do. |
| 112 | —CH₂— | K₁ | NO₂ | H | H | H | H | CH₃ | CH₃ | Reddish yellow. |
| 113 | —CH₂— | K₇ | NO₂ | H | H | H | H | CH₃ | CH₃ | Yellow. |
| 114 | —CH₂— | K₁₆ | NO₂ | H | H | H | H | CH₃ | CH₃ | Do. |
| 115 | —CH₂— | K₁₉ | NO₂ | H | H | H | H | CH₃ | CH₃ | Do. |
| 116 | —CH₂— | K₁ | CH₃ | H | CH₃O | H | H | H | —SO₂N(CH₃)₂ | Do. |
| 117 | —CH₂— | K₇ | CH₃ | H | CH₃O | H | H | H | —SO₂N(CH₃)₂ | Do. |
| 118 | —CH₂— | K₁₆ | CH₃ | H | CH₃O | H | H | H | —SO₂N(CH₃)₂ | Do. |
| 119 | —CH₂— | K₁ | CH₃ | H | CH₃O | H | H | H | SO₂—CH₃ | Do. |
| 120 | —CH₂— | K₇ | CH₃ | H | CH₃O | H | H | H | SO₂—CH₃ | Do. |
| 121 | —CH₂— | K₈ | CH₃ | H | CH₃O | H | H | H | SO₂—CH₃ | Do. |
| 122 | —CH₂— | K₁₅ | CH₃ | H | CH₃O | H | H | H | SO₂—CH₃ | Do. |
| 123 | —CH₂— | K₁₆ | CH₃ | H | CH₃O | H | H | H | SO₂—CH₃ | Do. |
| 124 | —CH₂— | K₁₉ | CH₃ | H | CH₃O | H | H | H | SO₂—CH₃ | Do. |
| 125 | —CH₂— | K₁ | Br | H | H | H | H | H | CH₃ | Do. |
| 126 | —CH₂— | K₇ | Br | H | H | H | H | H | CN | Do. |
| 127 | —CH₂— | K₈ | Br | H | H | H | H | H | Cl | Do. |
| 128 | —CH₂— | K₁₅ | Br | H | H | H | H | H | Cl | Do. |
| 129 | —CH₂— | K₁₆ | Br | H | H | H | H | H | Cl | Do. |
| 130 | —CH₂— | K₁₉ | Br | H | H | H | H | H | Cl | Do. |
| 131 | —CH₂— | K₁ | CH₃ | H | CH₃ | H | H | H | CH₂—N(C)CH₂—O (ring) | Do. |
| 132 | —CH₂— | K₇ | CH₃ | H | CH₃ | H | H | H | Same as above | Do. |
| 133 | —CH₂— | K₈ | CH₃ | H | CH₃ | H | H | H | do | Do. |
| 134 | —CH₂— | K₁₅ | CH₃ | H | CH₃ | H | H | H | do | Do. |
| 135 | —CH₂— | K₁₆ | CH₃ | H | CH₃ | H | H | H | do | Do. |
| 136 | —CH₂— | K₁₉ | H | H | CH₃ | H | H | H | do | Do. |
| 137 | —CH₂— | K₁ | H | Cl | H | H | H | H | CH₂—C(=O)—N—CH₂—CH₂ (ring) | Do. |
| 138 | —CH₂— | K₇ | H | Cl | H | CH₃ | H | H | Same as above | Do. |
| 139 | —CH₂— | K₁₅ | H | Cl | H | CH₃ | H | H | do | Do. |
| 140 | —CH₂— | K₁₉ | H | Cl | H | CH₃ | H | H | do | Do. |
| 141 | —CH₂— | K₁ | CH₃ | H | CH₃O | H | H | H | O—C(=O)—N—CH₂—CH₂ (ring) | Do. |
| 142 | —CH₂— | K₇ | CH₃ | H | CH₃O | H | H | H | Same as above | Do. |
| 143 | —CH₂— | K₈ | CH₃ | H | CH₃O | H | H | H | do | Do. |
| 144 | —CH₂— | K₁₅ | CH₃ | H | CH₃O | H | H | H | do | Do. |
| 145 | —CH₂— | K₁₆ | CH₃ | H | CH₃O | H | H | H | do | Do. |
| 146 | —CH₂— | K₁₉ | CH₃ | H | CH₃O | H | H | H | do | Do. |
| 147 | —CH₂— | K₁ | CH₃ | H | CH₃ | H | H | H | O—C(=O)—N—CH₂—CH₂—CH₂ (ring) | Do. |

Table I—Continued

| Ex. No. | W | k⊕ | X₁ | X₂ | X₃ | X₄ | X₅ | X₆ | X₇ | Shade of dyeing on polyacrylonitril fibre |
|---|---|---|---|---|---|---|---|---|---|---|
| 148 | —CH₂— | K₇ | CH₃ | H | CH₃ | H | H | H | Same as above | Do. |
| 149 | —CH₂— | K₁₆ | CH₃ | H | CH₃ | H | H | H | do | Do. |
| 150 | —CH₂— | K₁ | Cl | H | Cl | H | H | H | CH₃CONH— | Do. |
| 151 | —CH₂— | K₇ | Cl | H | Cl | H | H | H | CH₃CONH— | Do. |
| 152 | —CH₂— | K₁₆ | Cl | H | Cl | H | H | H | CH₃CONH— | Do. |
| 153 | —CH₂— | K₁ | CH₃ | H | Cl | H | H | H | ⌬—CO—NH— | Do. |
| 154 | —CH₂— | K₇ | CH₃ | H | Cl | H | H | H | Same as above | Do. |
| 155 | —CH₂— | K₈ | CH₃ | H | Cl | H | H | H | do | Do. |
| 156 | —CH₂— | K₁₉ | CH₃ | H | Cl | H | H | H | do | Do. |
| 157 | —CH₂— | K₁ | Cl | H | CH₃O | H | H | H | do | Do. |
| 158 | —CH₂— | K₇ | Cl | H | CH₃O | H | H | H | H₃C₂OOC—NH— | Do. |
| 159 | —CH₂— | K₁₆ | Cl | H | CH₃O | H | H | H | H₃C₂OOC—NH— | Do. |
| 160 | —CH₂— | K₁ | CH₃SO₂ | H | H | H | H | H | H₃C₂OOC—NH— | Do. |
| 161 | —CH₂— | K₇ | CH₃SO₂ | H | H | H | H | H | CH₃ | Do. |
| 162 | —CH₂— | K₈ | CH₃SO₂ | H | H | H | H | H | CH₃ | Do. |
| 163 | —CH₂— | K₁₅ | CH₃SO₂ | H | H | H | H | H | CH₃ | Do. |
| 164 | —CH₂— | K₁₆ | CH₃SO₂ | H | H | H | H | H | CH₃ | Do. |
| 165 | —CH₂— | K₁₉ | CH₃SO₂ | H | H | H | H | H | CH₃ | Do. |
| 166 | —CH₂— | K₁ | H | CH₃SO₂— | H | H | H | H | CH₃ | Do. |
| 167 | —CH₂— | K₇ | H | CH₃SO₂— | H | H | H | H | CH₃ | Do. |
| 168 | —CH₂— | K₁₆ | H | CH₃SO₂— | H | H | H | H | CH₃ | Do. |
| 169 | —CH₂— | K₁ | (CH₃)₂N—SO₂— | H | H | H | H | H | CH₃ | Do. |
| 170 | —CH₂— | K₇ | (CH₃)₂N—SO₂— | H | H | H | H | H | CH₃ | Do. |
| 171 | —CH₂— | K₈ | (CH₃)₂N—SO₂— | H | H | H | H | H | CH₃ | Do. |
| 172 | —CH₂— | K₁₅ | (CH₃)₂N—SO₂— | H | H | H | H | H | CH₃ | Do. |
| 173 | —CH₂— | K₁₆ | (CH₃)₂N—SO₂— | H | H | H | H | H | CH₃ | Do. |
| 174 | —CH₂— | K₁₉ | (CH₃)₂N—SO₂— | H | H | H | H | H | CH₃ | Do. |
| 175 | —CH₂— | K₁ | H | (CH₃)₂N—SO₂— | H | H | H | H | CH₃ | Do. |
| 176 | —CH₂— | K₇ | H | (CH₃)₂N—SO₂— | H | H | H | H | CH₃ | Do. |
| 177 | —CH₂— | K₁₆ | H | (CH₃)₂N—SO₂— | H | H | H | H | CH₃ | Do. |
| 178 | —CH₂— | K₁ | Cl | H | CH₃ | H | H | H | CH₃ | Do. |
| 179 | —CH₂— | K₇ | Cl | H | CH₃ | H | H | H | CH₃ | Do. |
| 180 | —CH₂— | K₁₆ | Cl | H | CH₃ | H | H | CH₃ | CH₃ | Do. |
| 181 | —CH₂— | K₂₂ | CH₃ | H | CH₃O | H | H | H | CH₃ | Do. |
| 182 | —CH₂— | K₂₃ | CH₃ | H | CH₃O | H | H | H | CH₃ | Do. |
| 182a | C₃H₆— | K₁ | C₂H₅ | H | H | H | H | H | CH₃ | Do. |
| 182b | CH₃–CH— | K₁ | OC₃H₇ | H | H | H | H | H | CH₃ | Do. |
| 182c | do | K₁ | H | C₄H₉—SO₂— | H | H | H | H | CH₃ | Do. |
| 182d | C₂H₅–CH– | K₁ | H | ⌬—SO₂— | H | H | H | H | CH₃ | Do. |
| 182e | C₂H₅— | K₁ | H | H | Br | H | H | H | CH₃ | Do. |
| 182f | C₂H₅— | K₁ | CH₃ | H | OCH₃ | H | H | H | Br | Do. |
| 182g | C₂H₅— | K₁ | CH₃ | H | OCH₃ | H | H | H | C₂H₅ | Do. |
| 182h | C₂H₅— | K₁ | CH₃ | H | OCH₃ | H | H | H | CH₃ | Do. |
| 182i | C₂H₅— | K₂ | CH₃ | H | OCH₃ | H | H | H | CH₃ | Do. |
| 182k | C₂H₅— | K₃ | CH₃ | H | OCH₃ | H | H | H | CH₃ | Do. |
| 182l | C₂H₅— | K₁₇ | CH₃ | H | OCH₃ | H | H | H | CH₃ | Do. |
| 182m | C₃H₆— | K₁ | Cl | H | H | H | H | H | CH₃ | Do. |

The symbols K⁺, X₁–X₇ and Y₁ in the formula

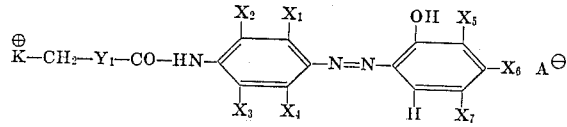

have the meanings assigned to them in Table 2. The anion A⁻ may be any one of those named in the specification. The symbol K⁺ may stand for any of the radicals K⁺ listed in Table A.

TABLE 2

| Example number | K⊖ | Y₁ | X₁ | X₂ | X₃ | X₄ | X₅ | X₆ | X₇ | Shade of dyeing on polyacrylonitril fibre |
|---|---|---|---|---|---|---|---|---|---|---|
| 183 | K₁ | ⌬ | Cl | H | H | H | H | H | CH₃ | Yellow. |
| 184 | K₁₆ | Same as above | Cl | H | H | H | H | H | CH₃ | Do. |
| 185 | K₁ | do | H | CH₃O | H | H | H | H | CH₃ | Do. |
| 186 | K₁₆ | do | H | CH₃O | H | H | H | H | CH₃ | Do. |
| 187 | K₁ | do | —CH₃ | CH₃O | CH₃O | H | H | H | CH₃ | Do. |
| 188 | K₁₆ | do | —CH₃ | CH₃O | CH₃O | H | H | H | CH₃ | Do. |
| 189 | K₁ | do | —CH₃ | CH₃O | CH₃ | H | H | H | CH₃ | Do. |
| 190 | K₁₆ | do | —CH₃ | CH₃O | CH₃ | H | H | H | CH₃ | Do. |
| 191 | K₁ | do | Cl | CH₃O | CH₃ | H | H | H | CH₃ | Do. |
| 192 | K₁₆ | do | Cl | CH₃O | CH₃ | H | H | H | CH₃ | Do. |
| 193 | K₁ | do | Cl | CH₃O | —OCH₃ | H | H | H | CH₃ | Do. |
| 194 | K₁₆ | do | Cl | CH₃O | —OCH₃ | H | H | H | CH₃ | Do. |
| 195 | K₁ | do | —CH₃ | CH₃O | —OCH₃ | H | H | H | CH₃ | Do. |
| 196 | K₁₆ | do | —CH₃ | CH₃O | —OCH₃ | H | H | H | CH₃ | Do. |
| 197 | K₁ | do | —CH₃ | —CH₃ | —OCH₃ | H | H | H | CH₃ | Do. |
| 198 | K₁₆ | do | —CH₃ | —CH₃ | —OCH₃ | H | H | H | CH₃ | Do. |
| 199 | K₁ | ⌬ | H | H | H | H | H | H | CH₃ | Do. |
| 200 | K₁₆ | do | H | H | H | H | H | H | CH₃ | Do. |

TABLE 2—Continued

| Ex. No. | W | k⊖ | X₁ | X₂ | X₃ | X₄ | X₅ | X₆ | X₇ | Shade of dyeing on polyacrylonitril fibre |
|---|---|---|---|---|---|---|---|---|---|---|
| 201 | | K₁ | CH₃-⟨⟩- | H | H | H | H | H | H | CH₃ | Do. |
| 202 | | K₁₆ | Same as above | H | H | H | H | H | H | CH₃ | Do. |
| 203 | | K₁ | ....do.... | H | CH₃O | H | H | H | H | CH₃ | Do. |
| 204 | | K₁₆ | ....do.... | H | CH₃O | H | H | H | H | CH₃ | Do. |
| 205 | | K₁ | ....do.... | —CH₃ | CH₃O | CH₃O | H | H | H | CH₃ | Do. |
| 206 | | K₁₆ | ....do.... | —CH₃ | CH₃O | CH₃O | H | H | H | CH₃ | Do. |

EXAMPLE 207

22.85 Parts of 4-amino-2-methoxy-1-(2'-chloropropionyl)-aminobenzene, prepared by reducing 1-(2'-chloropropionyl)-amino2-methoxy-4-nitrobenzene by the normal method, are diazotized with 6.9 parts of sodium nitrite in dilute hydrochloric acid at 0°. An ice cold suspension of 13 parts of 1-hydroxy-4-methylbenzene is added to the diazo solution and the pH is adjusted to 8.0 with sodium carbonate. On completion of the coupling reaction the resulting compound is filtered off. 17.4 Parts of this compound are entered into 3.6 parts of dimethylhydrazine and 100 parts of dimethyl formamide at 20° and the solution is stirred at 50° until the reaction is complete. It is run into dilute, ice cold hydrochloric acid to precipitate the reaction product as a chloride, and this is filtered off, dried and if necessary purified by recrystallization, e.g. from acetic acid. The new dye is obtained as a yellow powder which dyes polyacrylonitrile fibres in greenish yellow shades having good light and wet fastness.

Similarly good dyes are obtained when the 17.4 parts of 4-(2''-chloropropionylamino)-2'-hydroxy-3-methoxy-5'-methyl-1,1'-azobenzene in this Example are replaced either by 17.4 parts of 4-(1''-chloropropionylamino)-2'-hydroxy-3-methoxy-5'-methyl-1,1'-azobenzene or by 18.1 parts of 4-(3''-chlorobutyrylamino)-2'-hydroxy-4-methoxy-5'-methyl-1,1'-azobenzene and the procedure of this Example is followed.

Formulae of representative dyes of the foregoing Examples are as follows:

Having thus disclosed the invention, what we claim is:

1. A compound of the formula

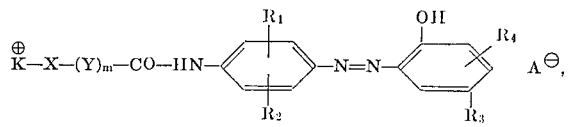

wherein

R₁ is hydrogen, lower alkyl, lower alkyl monosubstituted by hydroxy, halo, cyano or phenyl, lower alkoxy, halo, nitro, lower alkylsulfonyl, phenylsulfonyl, trifluoromethyl or sulfamoyl, R₂ is hydrogen, lower alkyl, lower alkyl monosubstituted by hydroxy, halo, cyano or phenyl, lower alkoxy or halo, R₃ is hydrogen, halo, alkyl of 1 to 6 carbon atoms, alkyl of 1 to 6 carbon atoms monosubstituted by hydroxy, halo, cyano or phenyl, alkoxy of 1 to 6 carbon atoms, cyano, lower alkylsulfonyl, phenylsulfonyl, acetamido, benzamido, ethoxycarbonylamino, N,N-dilower alkylsulfamoyl,

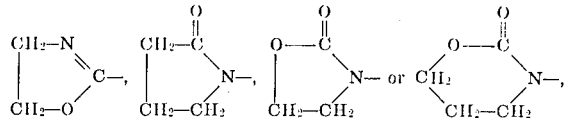

R₄ is hydrogen, halo, alkyl of 1 to 6 carbon atoms or alkyl of 1 to 6 carbon atoms monosubstituted by hydroxy, halo, cyano or phenyl X is straight or Example 5 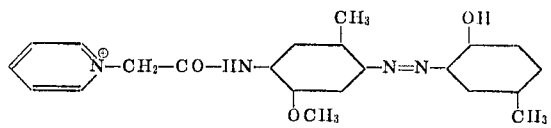 Anion⊖

Example 19 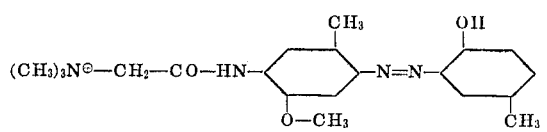 Anion⊖

Example 29 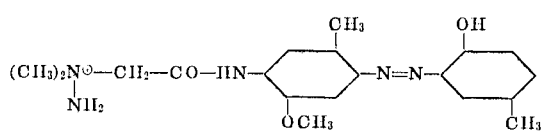 Anion⊖

Example 187 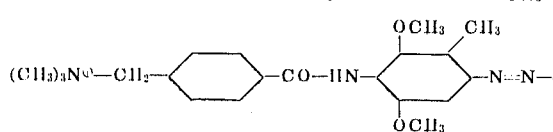 Anion⊖

Example 188 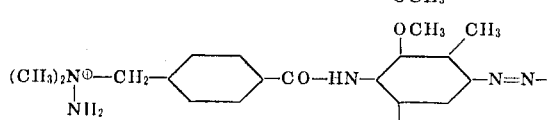 Anion⊖ branched chain alkylene of 1 to 6 carbon atoms or straight or branched chain alkylene of 1 to 6 carbon atoms monosubstituted by hydroxy, Y is phenylene, methylphenylene, naphthylene or tetrahydronaphthylene, $m$ is 0 or 1,

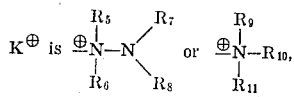

wherein each of $R_5$ and $R_6$ is independently alkyl of 1 to 4 carbon atoms, alkyl of 1 to 4 carbon atoms monosubstituted by hydroxy, halo, cyano or phenyl or cyclohexyl, each of $R_7$ and $R_8$ is independently hydrogen, alkyl of 1 to 4 carbon atoms, alkyl of 1 to 4 carbon atoms monosubstituted by hydroxy, halo, cyano or phenyl or cyclohexyl, or $R_5$ and $R_6$ taken together and with the nitrogen atom to which they are joined are pyrrolidinium, piperazinium, morpholinium, aziridinium or piperidinium, or $R_5$ and $R_7$ taken together and with the nitrogen atoms to which they are joined are pyrazolidinium, pyridazinium or pyrazolinium, or $R_5$, $R_6$, $R_7$ and $R_8$ taken together and with the nitrogen atoms to which they are joined are trimethylenepyrazolidinium or tetramethylenepyrazolidinium, each of $R_9$, $R_{10}$ and $R_{11}$ is independently alkyl of 1 to 4 carbon atoms, alkyl of 1 to 4 carbon atoms monosubstituted by hydroxy, halo, cyano or phenyl or cyclohexyl, or $R_9$ and $R_{10}$ taken together and with the nitrogen atom to which they are joined are pyrrolidinium, piperidinium, morpholinium, aziridinium or piperazinium, or $R_9$, $R_{10}$ and $R_{11}$ taken together and with the nitrogen atom to which they are joined are pyridinium, methylpyridinium, quninolinium or

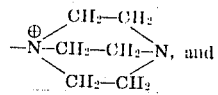

and $A^-$ is an anion, with the provisos that (1) at least one of $K^+$ and $R_3$ is heterocyclic, (2) when $m$ is 0, $R_1$ is other than hydrogen and $K^\oplus$ is 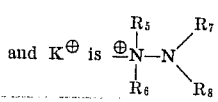

pyridinium, methylpyridinium or quinolinium, and (3) each halo is independently chloro or bromo.

2. A compound according to claim 1 wherein $m$ is 1.

3. A compound according to claim 2 wherein $R_1$ is lower alkyl, lower alkyl monosubstituted by hydroxy, halo, cyano or phenyl, lower alkoxy halo, nitro, lower alkylsulfonyl, phenylsulfonyl, trifluoromethyl or sulfamoyl.

4. A compound according to claim 3

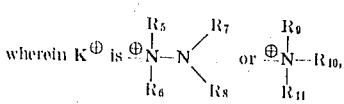

wherein $R_5$ and $R_6$ taken together and with the nitrogen atom to which they are joined are pyrrolidinium, piperazinium, morpholinium, aziridinium or piperidinium, each of $R_7$ and $R_8$ is independently hydrogen, alkyl of 1 to 4 carbon atoms, alkyl of 1 to 4 carbon atoms mono substituted by hydroxy, halo, cyano or phenyl or cyclohexyl, or $R_5$ and $R_7$ taken together and with the nitrogen atoms to which they are joined are pyrazolidinium, pyridazinium or pyrazolinium, or $R_5$, $R_6$, $R_7$ and $R_8$ taken together and with the nitrogen atoms to which they are joined are trimethylenepyrazolidinium or tetramethylenepyrazolidinium, $R_9$ and $R_{10}$ taken together and with the nitrogen atom to which they are joined are pyrrolidinium, piperidinium, morpholinium, aziridinium or piperazinium, and $R_{11}$ is alkyl of 1 to 4 carbon atoms, alkyl of 1 to 4 carbon atoms mono substituted by hydroxy, halo, cyano, or phenyl or cyclohexyl, or $R_9$, $R_{10}$ and $R_{11}$ taken together and with the nitrogen atom to which they are joined are pyridinium, methylpyridinium, quinolinium or

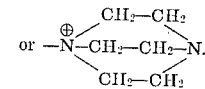

5. A compound according to claim 4 wherein $K^+$ is pyridinium, methylpyridinium or quinolinium.

6. A compound according to claim 4 wherein $R_1$ is methyl, ethyl, methoxy, ethoxy, trifluoromethyl, nitro, chloro or bromo, $R_2$ is hydrogen, methyl, ethyl, methoxy or ethoxy, $R_3$ is hydrogen, halo, alkyl of 1 to 6 carbon atoms or alkoxy of 1 to 6 carbon atoms, and $R_4$ is hydrogen.

7. A compound according to claim 1 wherein $R_1$ is lower alkyl, lower alkyl, mono substituted by hydroxy, halo, cyano or phenyl, lower alkoxy, halo, nitro, lower alkylsulfonyl, phenylsulfonyl, trifluoromethyl or sulfamoyl, and $R_3$ is 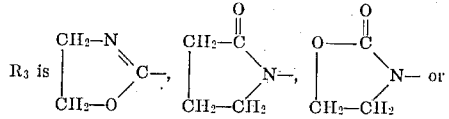

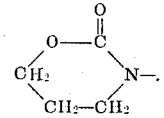

8. A compound according to claim 1 wherein $K^+$ is

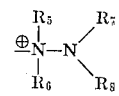

9. A compound according to claim 1 wherein $m$ is O, and $K^+$ is pyridinium, methylpyridinium or quinolinium.

10. A compound according to claim 9 wherein $R_1$ is methyl, ethyl, methoxy, ethoxy, trifluoromethyl, nitro, chloro or bromo, $R_2$ is hydrogen, methyl, ethyl, methoxy or ethoxy, $R_3$ is hydrogen, halo, alkyl of 1 to 6 carbon atoms or alkoxy of 1 to 6 carbon atoms, and
$R_4$ is hydrogen.
11. A compound according to claim 10 having the formula
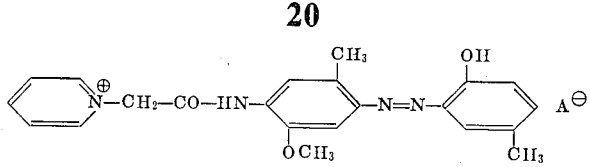
* * * * *